(12) United States Patent
Huang

(10) Patent No.: US 6,827,513 B2
(45) Date of Patent: Dec. 7, 2004

(54) ERGONOMIC KEYBOARD

(75) Inventor: Chou-Nan Huang, Tainan (TW)

(73) Assignee: Darfon Electronics Corp., Taoyuan (TW)

( * ) Notice: Subject to any disclaimer, the term of this patent is extended or adjusted under 35 U.S.C. 154(b) by 0 days.

(21) Appl. No.: 10/821,138

(22) Filed: Apr. 8, 2004

(65) Prior Publication Data

US 2004/0190969 A1 Sep. 30, 2004

Related U.S. Application Data

(62) Division of application No. 10/406,472, filed on Apr. 3, 2003.

(30) Foreign Application Priority Data

Apr. 8, 2002 (TW) ........................................ 91204520 U

(51) Int. Cl.[7] .................................................. B41J 5/00
(52) U.S. Cl. ........................................ 400/490; 400/489
(58) Field of Search ................................ 400/472, 486, 400/488, 489, 490, 491, 492, 493; 345/168; 341/22, 23; 361/680; 235/145 R

(56) References Cited

U.S. PATENT DOCUMENTS 5,481,263 A * 1/1996 Choi ............................ 341/20
5,767,463 A * 6/1998 Gandre ........................ 200/5 A

* cited by examiner

Primary Examiner—Ren Yan
(74) Attorney, Agent, or Firm—Quintero Law Office

(57) ABSTRACT

An ergonomic keyboard. The keyboard includes a main body and first, second and third key groups disposed thereon. The third key group is arranged between the first key group and the second key group. The top surfaces of the keys of the first key group and the second key group are inclined to the third key group by a first angle, such that the keyboard can be more ergonomically sound.

10 Claims, 10 Drawing Sheets

ERGONOMIC KEYBOARD

This application is a divisional of U.S. application Ser. No. 10/406,472, filed Apr. 3, 2003.

BACKGROUND OF THE INVENTION

1. Field of the Invention

The present invention relates to a keyboard, and in particular to an ergonomic keyboard with more comfortably angled key caps.

2. Description of the Related Art

FIGS. 1A~1C show a key of a conventional keyboard shown in FIG. 2. In FIGS. 1A~1C, the key 10 of the conventional keyboard 20 includes a key cap and a connection portion 13 extending from the bottom of the key cap. The key cap has a top surface 11 with top edges 111 and a plurality of second side surfaces with bottom edges 121. Each of the top edges 111 is parallel to the bottom edge 121 of the same second side surface. In order to satisfy the ergonomics and make users more comfortable when typing, the top surfaces 11 of the key caps of the conventional keyboard are cambered surfaces and have a forward inclined angle φ with respect to the horizontal plane. The keys 10 are movably disposed on the conventional keyboard 20 as shown in FIG. 2.

While the keys of the conventional keyboard can have several ergonomic designs, the hands of a user when typing are not parallel, but, rather, form an angle. The conventional keyboard is therefore not as comfortable during use as it might be. Hence, there is a need for a more comfortably used keyboard with improved key structure to satisfy ergonomics.

SUMMARY OF THE INVENTION

Accordingly, an object of the invention is to provide a keyboard with improved key structure that is more comfortably used than conventional keyboards.

The present invention provides an ergonomic keyboard and the key structure thereof. The keyboard includes a main body and a first key group. The first key group has a plurality of first keys with a first key cap and a first connection portion. The first keys are movably connected to the main body through the first connection portions. Each of the first key caps has a first top surface with a plurality of first top edges and a plurality of first side surfaces extending from the first top edges. The bottom edges form a first bottom surface. The projection of each of the first top edges on the first bottom surface is inclined clockwise to the first bottom edge of the same first side surface by an included angle.

The keyboard of the invention further includes a second key group having a plurality of second keys with a second key cap and a second connection portion. The second keys are movably connected to the main body through the second connection portions. Each of the second key caps has a second top surface with a plurality of second top edges and a plurality of second side surfaces extending from the second top edges. Each of the second side surfaces has a second bottom edge and forming a second bottom surface. The projection of each keyboard of the second top edges on the second bottom surface is inclined counterclockwise to the second bottom edge of the same second side surface by the included angle.

The keyboard further includes a third key group having a plurality of third keys with a third key cap and a third connection portion. The third keys are movably connected to the main body through the third connection portions and disposed between the first key group and the second key group. The projection of each of the third top edges on the third bottom surface is parallel to the third bottom edge of the same third side surface. The first included angle is less than 30°. The first top surface, the second top surface, and the third top surface are cambered surfaces.

The present invention also provides another ergonomic keyboard including a main body and a first key group having a plurality of first keys with a first key cap and a first connection portion. The first keys are movably connected to the main body through the first connection portions along a predetermined line. Each of the first key caps has a first top surface with a first symmetrical axis inclined to the predetermined line by a first acute angle.

Furthermore, the keyboard of the invention further includes a second key group having a plurality of second keys with a second key cap and a second connection portion. The second keys are movably connected to the main body through the second connection portions along the predetermined line. Each of the second key caps has a second top surface with a second symmetrical axes inclined to the predetermined line by a second acute angle.

Moreover, the keyboard further includes a third key group having a plurality of third keys with a third key cap and a third connection portion. The third keys are movably connected to the main body through the third connection portions along the predetermined line and disposed between the first key group and the second key group. Each of the third symmetrical axes is perpendicular to the predetermined line. The first acute angle and second acute angle are between 30° and 50°. The first top surface, the second top surface, and the third top surface are cambered surfaces.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

First Embodiment

Figure 1A:
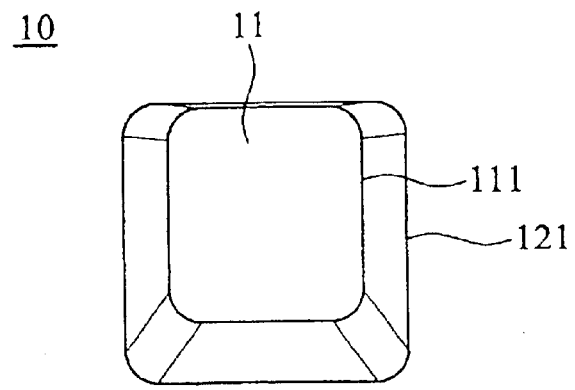
FIGS. 1A~1C show a key of a conventional keyboard as referenced in the Prior Art.
Figure 1B:
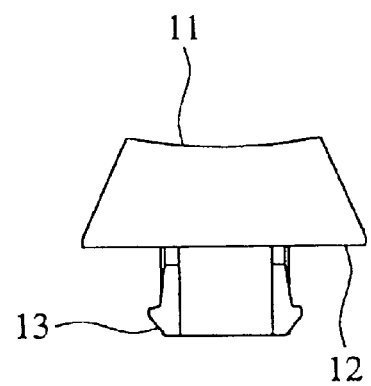
Figure 1C:
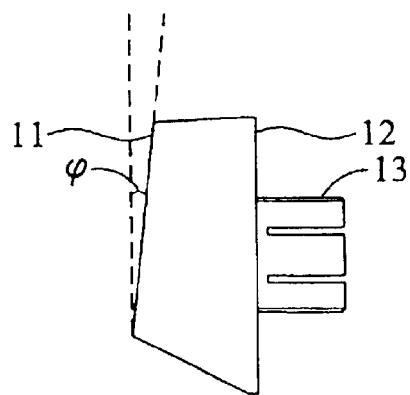
Figure 2:
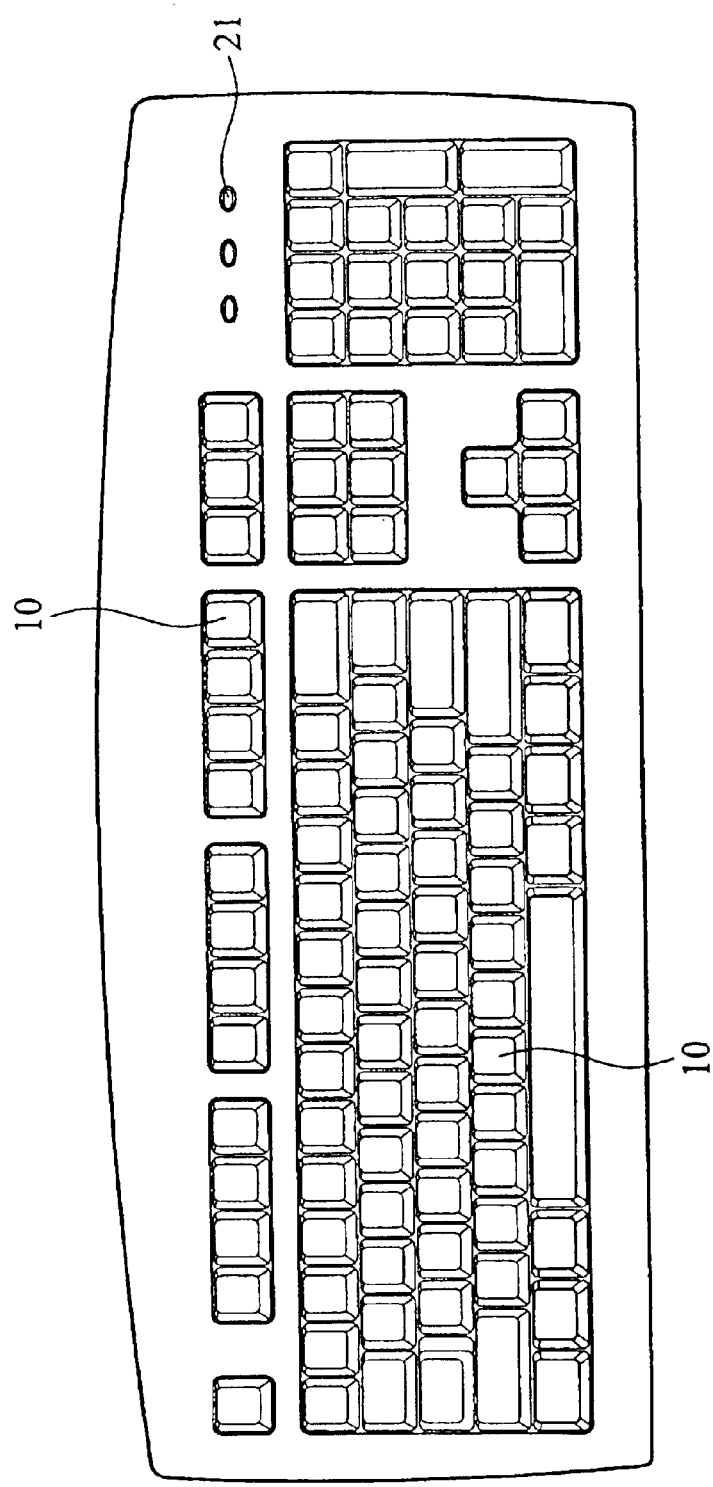
FIG. 2 is a schematic top view of the conventional keyboard.
Figure 3A:
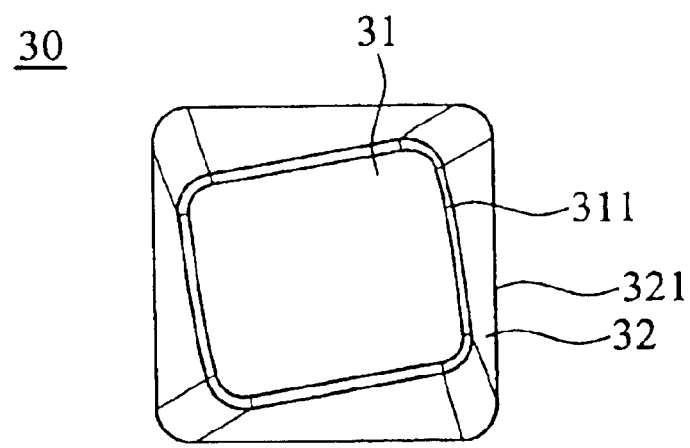
FIG. 3A is top view of the key of the invention.
Figure 3B:
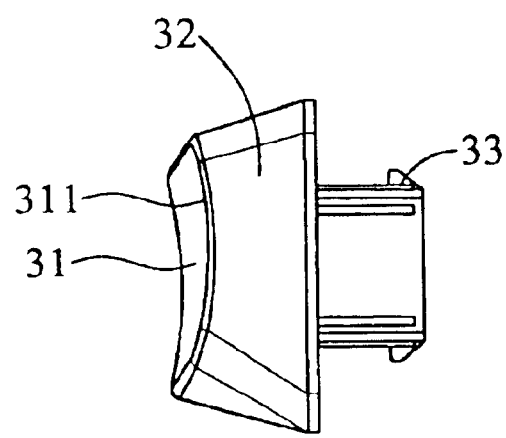
FIG. 3B is side view of the key of the invention.
Figure 3C:
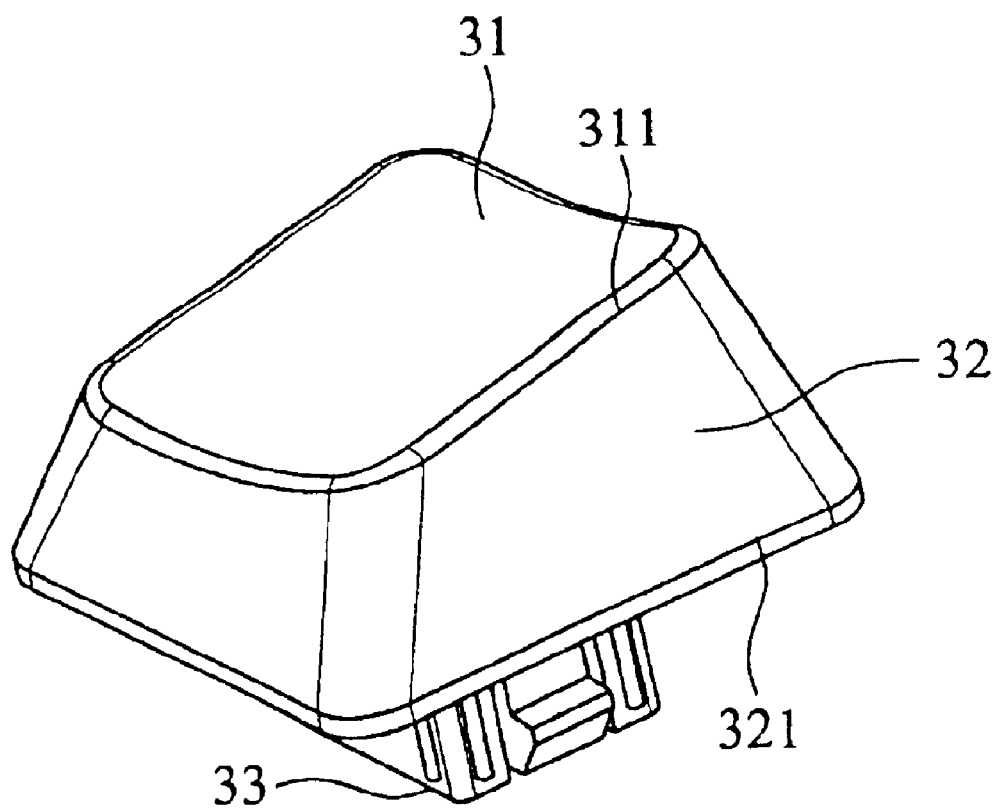
FIG. 3C is perspective view of the key of the invention.

FIGS. 3A~3C show a key of the first embodiment of the invention. In FIGS. 3A~3C, the key 30 includes two portions, the key cap and the connection portion 33. The connection portions 33 extending from the bottom of the key cap connect the key to the keyboard. The key cap has a top surface 31 with a plurality of top edges 311 and a plurality of side surfaces 32 extending from the top edges 31. Each side surface 32 has a bottom edge 321, defining a bottom surface according to the enclosed bottom edges 321. In FIG. 3A, the top surface 31 and the bottom surface of the key cap have a similar geometric figure, but the top edges 311 of the top surface 31 are not parallel to the bottom edges 321 of the bottom surface. The top edge 311 and the bottom edge 321 of the same side surface 32 form a first included angle. Moreover, the top surface 31 is a cambered surface as shown in FIG. 3B.

Figure 4A:
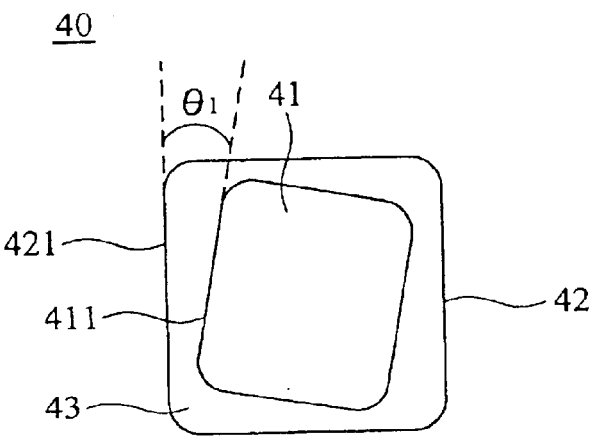
FIGS. 4A~4C are schematic views of three kinds of keys shown in FIG. 4D.
Figure 4B:
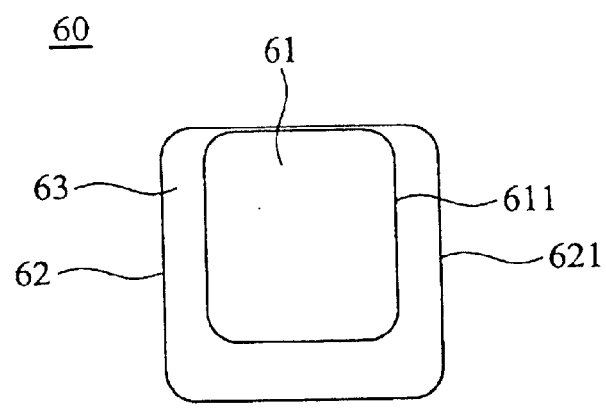
Figure 4C:
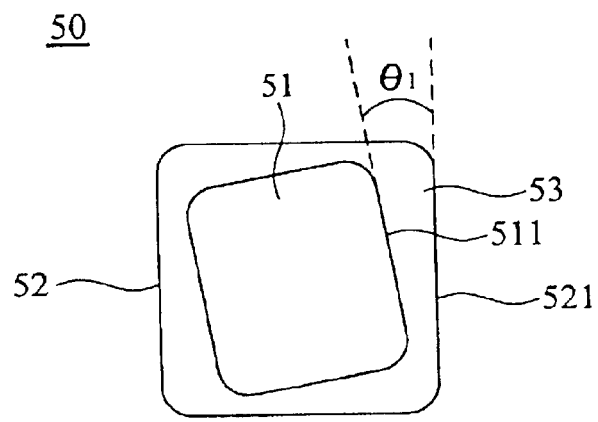
Figure 4D:
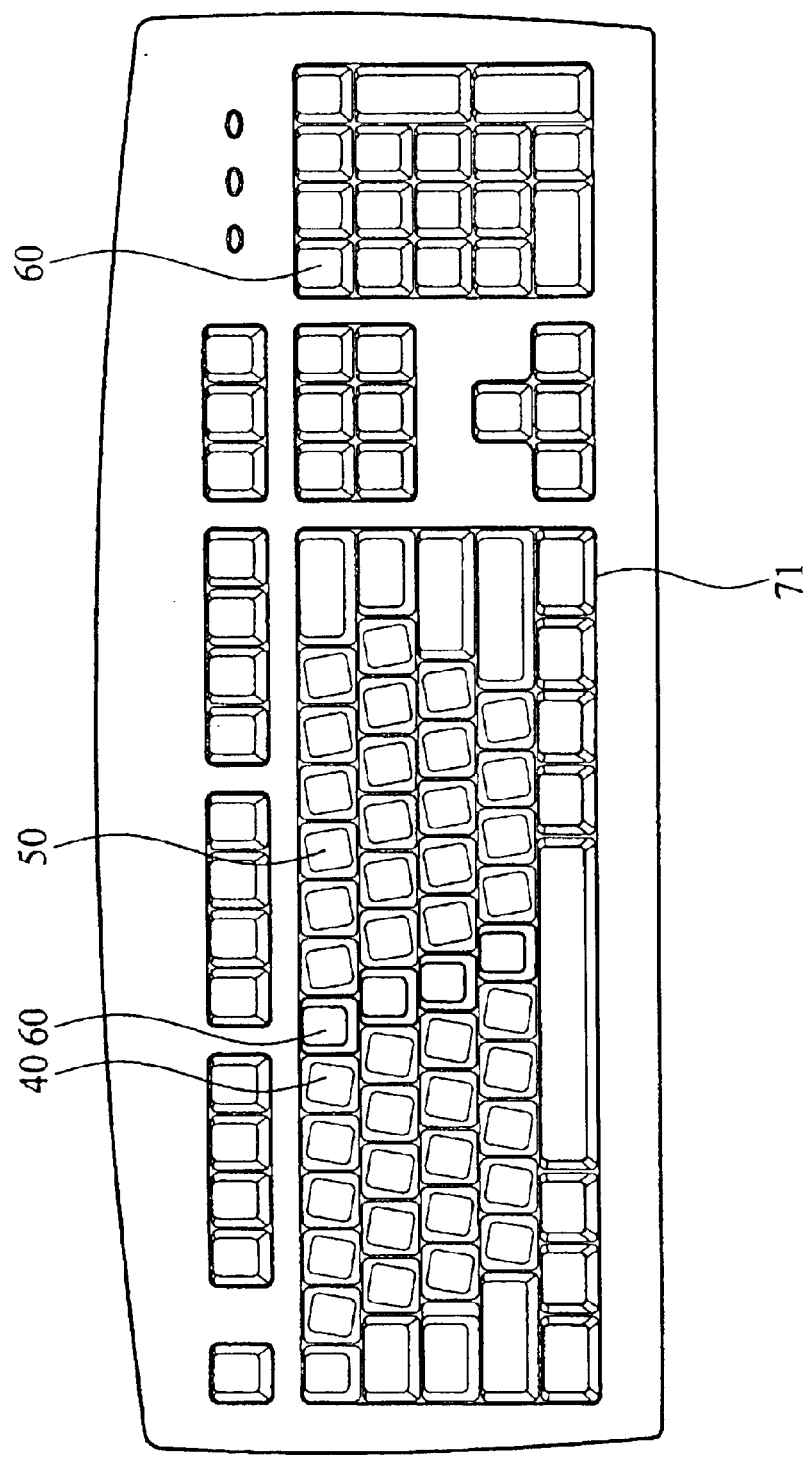
FIG. 4D is a top view of the ergonomic keyboard of the invention.

FIG. 4D shows an ergonomic keyboard in the first embodiment of the invention. There are three kinds of keys 40, 50, 60 disposed on the keyboard 70. FIG. 4A shows a top projection view of a key of the first key group shown in FIG. 4D. The first key cap 40 has a first top surface 41 with a plurality of first top edges 411 and a plurality of first side surfaces 43 extending from the first top edges 411. The bottom edges 421 enclose a first bottom surface 42. The first top edges 411 of the first top surface 41 are not parallel to the first bottom edges 421 of the defined first bottom surface 42. The projection of the first top surface 41 is rotated clockwise by an included angle $\theta_1$ with respect to the first bottom surface 42. That is; the projection of each of the first top edges 411 on the first bottom surface 42 is inclined clockwise to the first bottom edge 421 of the same first side surface 43 by an included angle $\theta_1$.

FIG. 4C shows a top projection view of a key of the second key group shown in FIG. 4D. The second key cap 50 has a second top surface 51 with a plurality of second top edges 511 and a plurality of second side surfaces 53 extending from the second top edges 511. The bottom edges 521 enclose a second bottom surface 52. The second top edges 511 of the second top surface 51 are not parallel to the second bottom edges 521 of the defined second bottom surface 52. The projection of the second top surface 51 is counter-rotated clockwise by the included angle $\theta_1$ with respect to the second bottom surface 52. As well, the projection of each of the second top edges 511 on the second bottom surface 52 is s inclined counterclockwise to the second bottom edge 521 of the same second side surface 53 by the included angle $\theta_1$.

FIG. 4B shows a top projection view of a key of the third key group shown in FIG. 4D. The third key cap 60 has a third top surface 61 with a plurality of third top edges 611 and a plurality of third side surfaces 63 extending from the third top edges 611. The bottom edges 621 enclose a third bottom surface 62. However, the third top edges 611 of the third top surface 61 are parallel to the third bottom edges 621 of the defined third bottom surface 62, as the key caps of the conventional keyboard.

In FIG. 4D, the keyboard of the first embodiment has a main typing area 71 with three kinds of keys shown in FIGS. 4A~4C for more comfortable use. The first key group, including a plurality of first keys 40, or clockwise-rotated keys, is disposed on the left side of the main typing area 71. The second key group, including a plurality of second keys 50, or counterclockwise-rotated keys, is disposed on the right side of the main typing area 71. The third key group, including a plurality of third keys 60 as shown in FIG. 4B is disposed between the first and second key groups on the main typing area 71. The keyboard 70 of the first embodiment is more ergonomically sound than conventional keyboards, because the top surfaces of the first and the second keys 40, 50 tilt to the third keys 60 by the included angle $\theta_1$, which is less than 30° and more comfortably fits the angle between two hands when a user is typing.

Second Embodiment

Figure 5A:
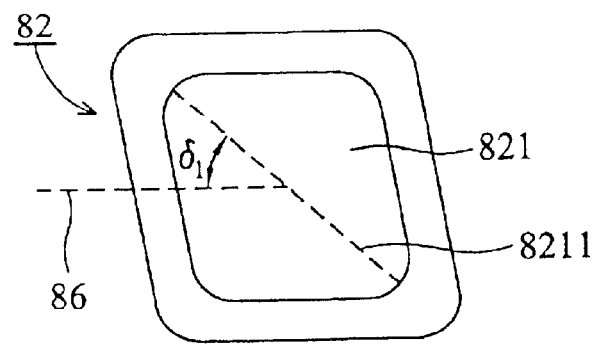
FIGS. 5A~5C are schematic views of three kinds of keys shown in FIG. 5D.
Figure 5B:
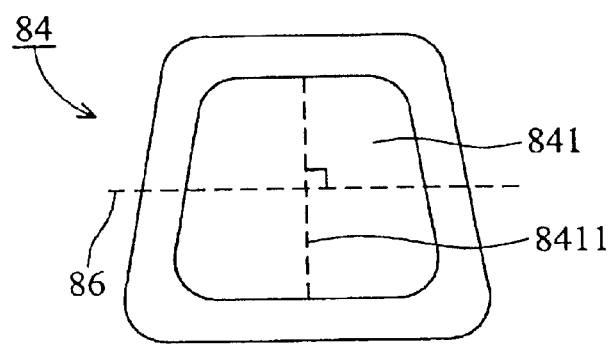
Figure 5C:
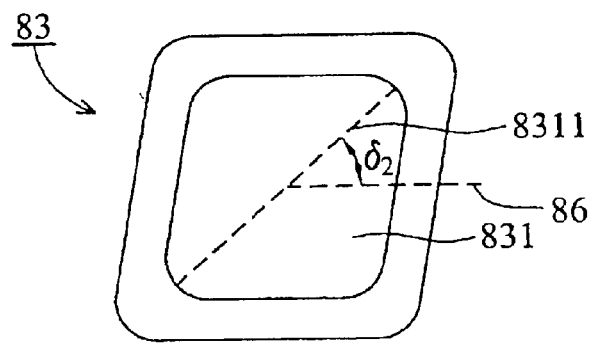
Figure 5D:
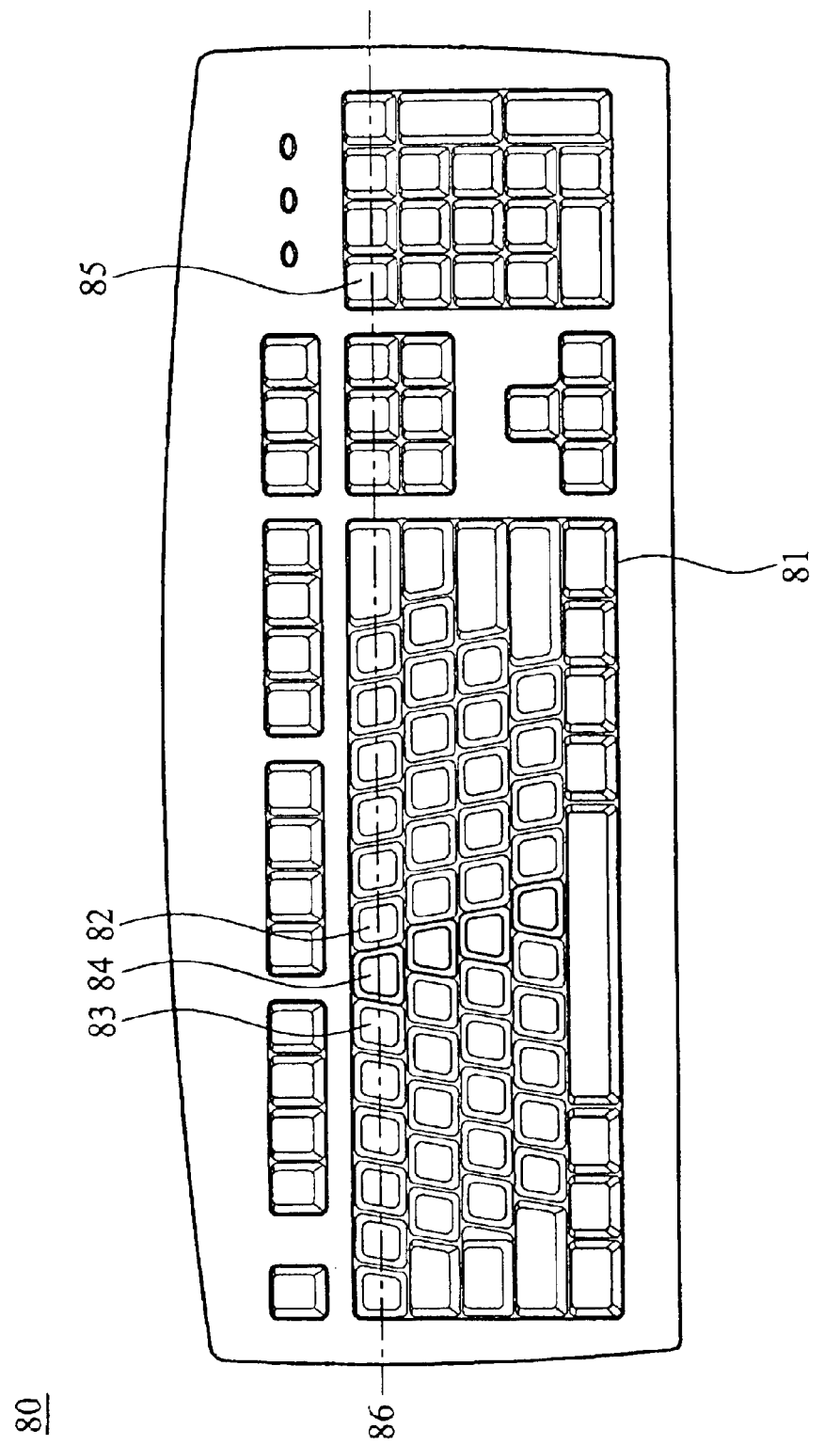
FIG. 5D is a top view of the ergonomic keyboard of second embodiment.

FIG. 5D shows another ergonomic keyboard of the invention. There are also three kinds of keys 82, 83, 84 disposed on the keyboard 80. FIGS. 5A~5C are schematic views of three kinds of keys shown in FIG. 5D. The first top surface 821 of a first key 82 shown in FIG. 5A is a filleted parallelogram with a first symmetrical axis 8211. The second top surface 831 of a second key 83 shown in FIG. 5C is also a filleted parallelogram, is opposite to the first key 82, with a second symmetrical axes 8311. The third top surface 841 of a third key 84 shown in FIG. 5B is a filleted trapezoid with a third symmetrical axis 8411. The first top surface 821, the second top surface 831, and the third top surface 841 are cambered surfaces.

In FIG. 5D, the keyboard of the second embodiment has a main typing area 81 with three kinds of keys shown in FIGS. 5A~5C for more comfortable use. The first key group, including a plurality of first keys 82, or leftward inclined keys, is disposed on the left side of the main typing area 81. The first keys 82 of the first key group are movably disposed on the keyboard 80 through the first connection portions (not shown) along a predetermined line 86. Therefore, each of the first symmetrical axes 8211 is inclined to the predetermined line 86 by a first acute angle $\delta_1$ as in FIG. 5A.

The second key group, including a plurality of second keys 83, or rightward inclined keys, is disposed on the right side of the main typing area 81. The second keys 83 of the second key group are movably disposed on the keyboard 80 through the second connection portions (not shown) along the predetermined line 86. Therefore, each of the second symmetrical axes 8311 is inclined to the predetermined line 86 by a second acute angle $\delta_2$. The first acute angle $\delta_1$ and the second acute angle $\delta_2$ are between 30° and 50°.

Moreover, the third key group, including a plurality of third keys 84 as shown in FIG. 5B is disposed between is the first and second key groups on the main typing area 81 as shown in FIG. 5D. The third symmetrical axis 8411 is perpendicular to the predetermined line 86. Hence, the keyboard 80 of the second embodiment is more ergonomically sound than the conventional keyboard, because the top surfaces of the first and the second key groups tilt to the third key group. This design more comfortably fits the angle of users' hands.

Third Embodiment

Figure 6A:
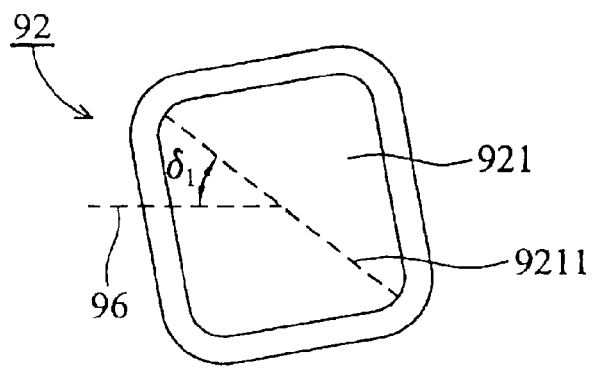
FIGS. 6A~6C are schematic views of three kinds of keys shown in FIG. 6D.
Figure 6B:
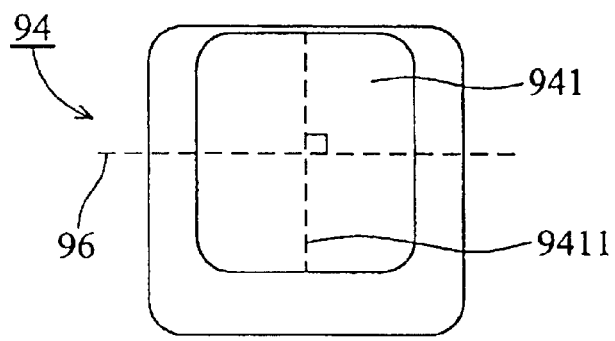
Figure 6C:
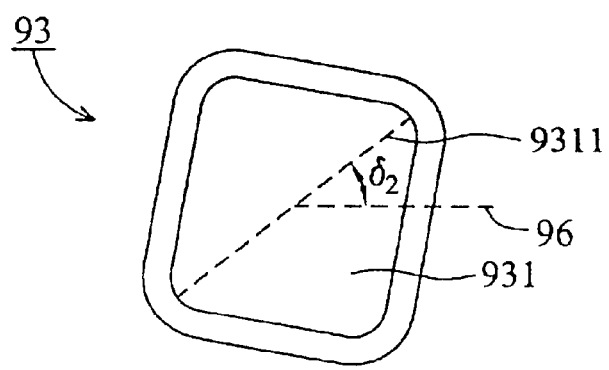
Figure 6D:
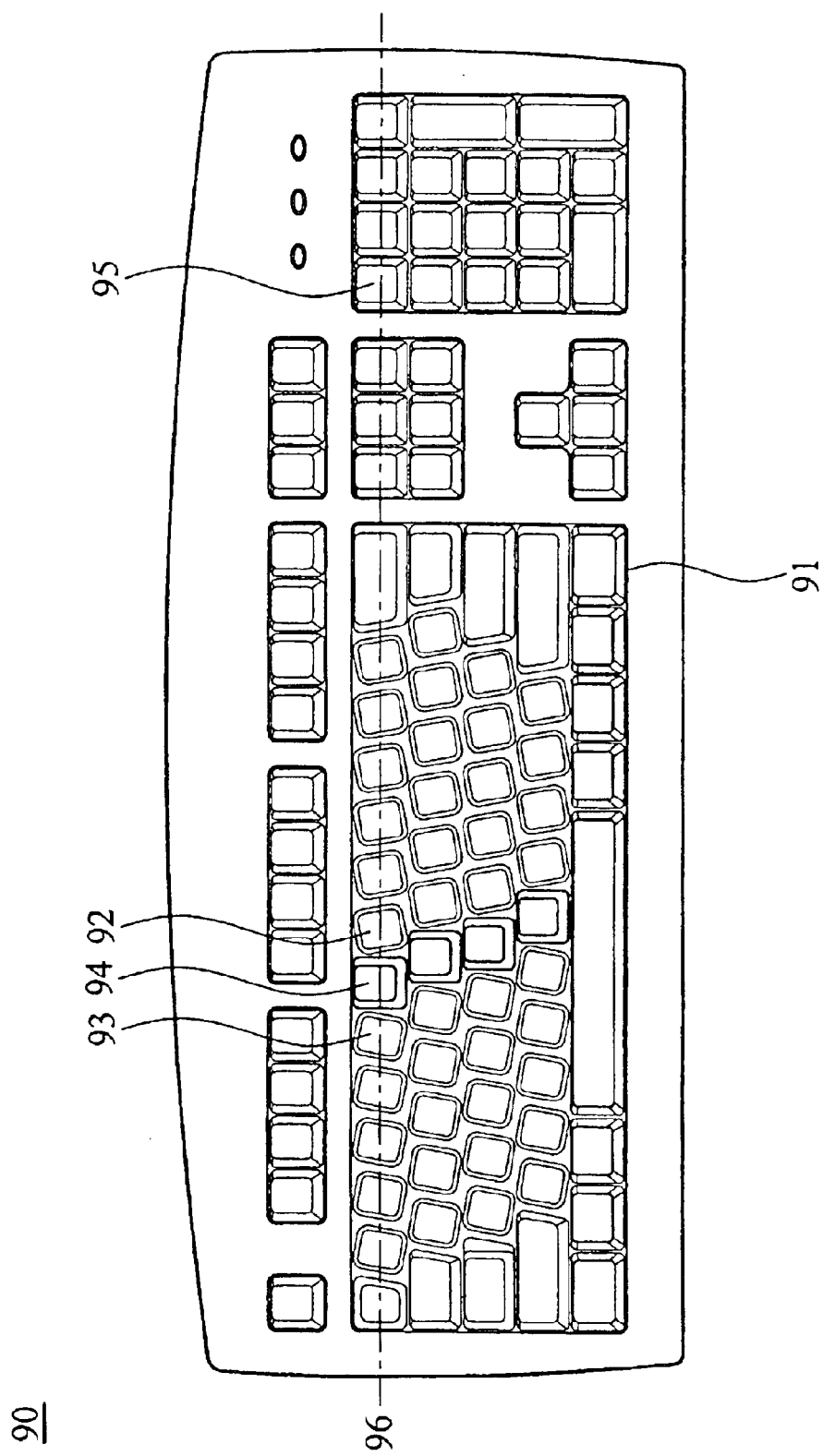
FIG. 6D is a top view of the ergonomic keyboard of third embodiment.

FIG. 6D shows another ergonomic keyboard of the invention. FIGS. 6A~6C are schematic views of three kinds of keys shown in FIG. 6D. In FIG. 6D, the keyboard 90 of the third embodiment has a main typing area 91 with three kinds of keys 92, 93, 94, shown in FIGS. 6A~6C, for more comfortable use. The first key group, including a plurality of first keys 92, or leftward inclined keys, is disposed on the left side of the main typing area 91. The first top surface 921 of a first key 92 shown in FIG. 6A is a filleted square with a first symmetrical axis 9211. The first keys 92 of the first key group are S movably disposed on the keyboard 90 through the first connection portions (not shown) along a predetermined line 96. Therefore, each of the first symmetrical axes 9211 is inclined to the predetermined line 96 by a first acute angle $\delta_1$.

In FIG. 6D, The second key group, including a plurality of second keys 93, or rightward inclined keys, is disposed on the right side of the main typing area 91. The second keys 93 of the second key group are movably disposed on the keyboard 90 through the second connection portions (not shown) along the predetermined line 96. The second top surface 931 of a second key 93 shown in FIG. 6C is also a filleted square, opposite to the first key 92, with a second symmetrical axes 9311. Therefore, each of the second symmetrical axes 9311 is inclined to the predetermined line 96 by a second acute angle $\delta_2$. Moreover, the first acute angle $\delta_1$ and the second acute angle $\delta_2$ are between 30° and 50°.

The third key group, including a plurality of third keys 94 as shown in FIG. 6B is disposed between the first and second key groups on the main typing area 91 as shown in FIG. 6D. The third key 94 is the same as a conventional key. The third top surface 941 of the third key 94 has a third symmetrical axis 9411 perpendicular to the predetermined line 96. Moreover, the first top surface 921, the second top surface 931, and the third top surface 941 are cambered surfaces. Thus, the keyboard 90 of the third embodiment is more ergonomically sound than the conventional keyboard, because the top surfaces of the first and the second key groups tilt to the third key group. This design more comfortably fits the angle of users' hands.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A key structure, comprising:
   a key cap, having a top surface with a plurality of top edges and a plurality of side surfaces extending from the top edges, each side surface having a bottom edge, the bottom edges forming a bottom surface;
   wherein the projection each of the top edges on the bottom surface and the bottom edge of the same side surface form a first included angle.

2. The key structure as claimed in claim 1, wherein the first included angle is less than 30°.

3. The key structure as claimed in claim 1, wherein the top surface and the bottom surface of the key cap have a similar geometric figure.

4. The key structure as claimed in claim 1, wherein the top surface is a cambered surface.

5. A keyboard, comprising:
   a main body;
   a first key group, having a plurality of first keys with a first key cap and a first connection portion, the first keys movably connected to the main body through the first connection portions, each of the first key caps having a first top surface with a plurality of first top edges and a plurality of first side surfaces extending from the first top edges, each of the first side surfaces having a first bottom edge, the first bottom edges forming a first bottom surface; and
   wherein the projection of each of the first top edges on the first bottom surface is inclined clockwise to the first bottom edge of the same first side surface by an included angle.

6. The keyboard as claimed in claim 5, wherein the first included angle is less than 30°.

7. The keyboard as claimed in claim 5, further comprising:
   a second key group, having a plurality of second keys with a second key cap and a second connection portion, the second keys movably connected to the main body through the second connection portions, each of the second key caps having a second top surface with a plurality of second top edges and a plurality of second side surfaces extending from the second top edges, each of the second side surfaces having a second bottom edge, and the second bottom edges forming a second bottom surface; and
   wherein the projection of each of the second top edges is inclined counterclockwise to the second bottom edge of the same second side surface by the included angle.

8. The keyboard as claimed in claim 7, further comprising:
   a third key group, having a plurality of third keys with a third key cap and a third connection portion, the third keys movably connected to the main body through the third connection portions and disposed between the first key group and the second key group, each of the third key caps having a third top surface with a plurality of third top edges and a plurality of third side surfaces extending from the third top edges, each of the third side surfaces having a third bottom edge, and the third bottom edges forming a third bottom surface; and
   wherein the projection of each of the third top edges on the third bottom surface is parallel to the third bottom edge of the same third side surface.

9. The keyboard as claimed in claim 8, wherein the first top surface and the first bottom surface, the second top surface and the second bottom surface, and the third top surface and the third bottom surface have similar geometric figures.

10. The key structure as claimed in claim 5, wherein the first top surface, the second top surface, and the third top surface are cambered surfaces.

* * * * *